United States Patent

Kramer

Patent Number: 5,201,392
Date of Patent: Apr. 13, 1993

[54] CHANGE OF STATE COUPLING

[75] Inventor: Richard E. Kramer, Damascus, Md.

[73] Assignee: Fairchild Space and Defense Corporation, Germantown, Md.

[21] Appl. No.: 883,611

[22] Filed: May 15, 1992

[51] Int. Cl.$^5$ .................. F16D 35/00; F16D 57/02; F16F 9/46
[52] U.S. Cl. ................... 192/58 B; 192/82 T; 188/268; 188/276; 188/322.5
[58] Field of Search ............. 192/58 R, 58 B, 82 T, 192/21.5; 464/17, 24; 188/276, 268, 290, 322.5

[56] References Cited

U.S. PATENT DOCUMENTS

| | | | |
|---|---|---|---|
| 1,183,530 | 5/1916 | Brennan | 192/58 B |
| 2,539,534 | 1/1951 | Eckhardt | 192/82 T |
| 2,575,360 | 11/1951 | Rabinow | 192/21.5 |
| 3,064,454 | 11/1962 | Sharples | 192/82 T |
| 3,193,068 | 7/1965 | Greve et al. | 192/82 T |
| 3,827,259 | 8/1974 | Brucker | 192/82 T X |
| 4,287,975 | 9/1981 | Tuzson | 192/82 T |
| 4,444,298 | 4/1984 | Stangroom | 192/21.5 |
| 4,842,106 | 6/1989 | Ludwig et al. | 188/276 X |

Primary Examiner—Richard M. Lorence
Attorney, Agent, or Firm—Michael W. York

[57] ABSTRACT

A change of state coupling for controlling the rotation of a rotatable shaft in a housing through the application of heat. A disk is secured for rotation with the portion of the shaft that is located within the housing. Heaters are also located within the housing and a liquid predetermined temperature change of state material is located in the housing around the disk and the heaters. The predetermined temperature change of state material for use in the housing is selected for a melting point that insures that the predetermined temperature change of state material is solid at the temperature to which the housing is usually exposed. However, when heat is applied to the predetermined temperature change of state material by the heaters the normally solid predetermined temperature change of state material becomes liquid and thus permits the rotatable shaft to rotate within the housing. The invention offers numerous advantages over conventional couplings and has numerous uses such as a damper, caging device, clutch and a brake and is particularly useful for difficult locations such as in space.

11 Claims, 2 Drawing Sheets

CHANGE OF STATE COUPLING

BACKGROUND OF THE INVENTION

Couplings for rotating members and the like have many uses. The simplest coupling merely serves to connect one rotating member to a second rotating member or the like. However, in many cases it is desired that the coupling do more than merely transmit the force or rotation from one rotating member to another. Frequently, it is desired that a coupling be capable of disconnecting at least partially one rotating member from another. Such couplings can serve as clutches, dampers, caging devices and brakes.

Most of such couplings that serve as clutches, dampers, caging devices and brakes incorporate parts or components that are subject to wear which requires periodic maintenance or inspection and repair. Their useful lifetime without repair or overhaul is limited and their long term reliability is low. This also means that such couplings must be readily accessible for inspection and any needed repair or overhaul. Such couplings are not well suited for use in remote locations where they are not readily accessible. Examples of such locations where such couplings are not well suited include space and undersea use. In spite of the fact that such conventional couplings as clutches, dampers caging devices and brakes are not well suited for use in such remote locations as space, there is a definite important need for such devices in space.

This invention overcomes these previous problems associated with couplings that serve as clutches, dampers, caging devices and brakes and permits such devices to be readily used in remote locations such as space and the like. This is possible since the invention offers numerous advantages over conventional devices including providing a coupling that is virtually maintenance free.

SUMMARY OF THE INVENTION

This invention relates to couplings and more particularly to a coupling that is activated by a change of state.

It is therefore an object of the present invention to provide a change of state coupling that is suitable for many uses.

It is an object of the invention to provide a change of state coupling that is simple in operation.

It is an object of the invention to provide a change of state coupling that is reliable in operation.

It is an object of the invention to provide a change of state coupling that is of few parts.

It is an object of the invention to provide a change of state coupling that does not wear.

It is the object of the invention to provide a change of state coupling that has low or no maintenance.

It is an object of the invention to provide a change of state coupling that has a long life.

It is an object of the invention to provide a change of state coupling that is smooth in operation.

It is an object of the invention to provide a change of state coupling that is easy to repair.

It is an object of the invention to provide a change of state coupling that is inexpensive to repair.

It is an object of the invention to provide a change of state coupling that is easy to modify to change its clutch or dampening capabilities.

It is an object of the invention to provide a change of state coupling that is easy to manufacture.

It is an object of the invention to provide a change of state coupling that is inexpensive to manufacture.

It is an object of the invention to provide a change of state coupling that is suitable for use in space.

It is an object of the invention to provide a change of state coupling that can be remotely controlled.

It is an object of the invention to provide a change of state coupling that can be cycled on and off numerous times.

It is an object of the invention to provide a change of state coupling that can be operated in either a clockwise or a counter clockwise direction.

It is an object of the invention to provide a change of state coupling that is easily adjustable.

It is an object of the invention to provide a change of state coupling that has no long term fluid seal problems.

It is an object of the invention to provide a change of state coupling that only operates when activated.

It is an object of the invention to provide a change of state coupling that can be operated with an internal or external heater or both.

It is an object of the invention to provide a change of state coupling that is self-locking when heat or heater power is removed or lost.

It is an object of the invention to provide a change of state coupling that requires only low electrical power.

It is an object of the invention to provide a change of state coupling that is easy to scale in terms of size.

It is an object of the invention to provide a change of state coupling that can be constructed using a wide variety of materials.

It is an object of the invention to provide a change of state coupling that can be constructed using all nonmagnetic materials.

It is an object of the invention to provide a change of state coupling that can be used as a damper.

It is an object of the invention to provide a change of state coupling for use as a damper that has an adjustable damping rate and torque range.

These and other objects will be apparent from the change of state coupling invention that includes a hollow housing, a rotatable shaft having a portion thereof located within the housing and a rotatable disk secured for rotation with the shaft portion located within. A heater or heaters are located within and/or exterior to the hollow housing and a liquid predetermined temperature change of state material that is normally solid at the normal temperature for the housing is located within the housing around the disk and the heater or heaters. At least one perforated member is connected to the housing and has a portion extending into the interior of the housing. The normally solid liquid will normally prevent rotation of the rotatable shaft with respect to the housing. However, when the heater or heaters supply heat to the solid liquid, it will liquify and hence permit rotation of the shaft with respect to the housing.

BRIEF DESCRIPTION OF THE DRAWINGS

The invention will be hereinafter more fully described with reference to the accompanying drawings in which.

DETAILED DESCRIPTION OF THE PREFERRED EMBODIMENTS

Figure 1:
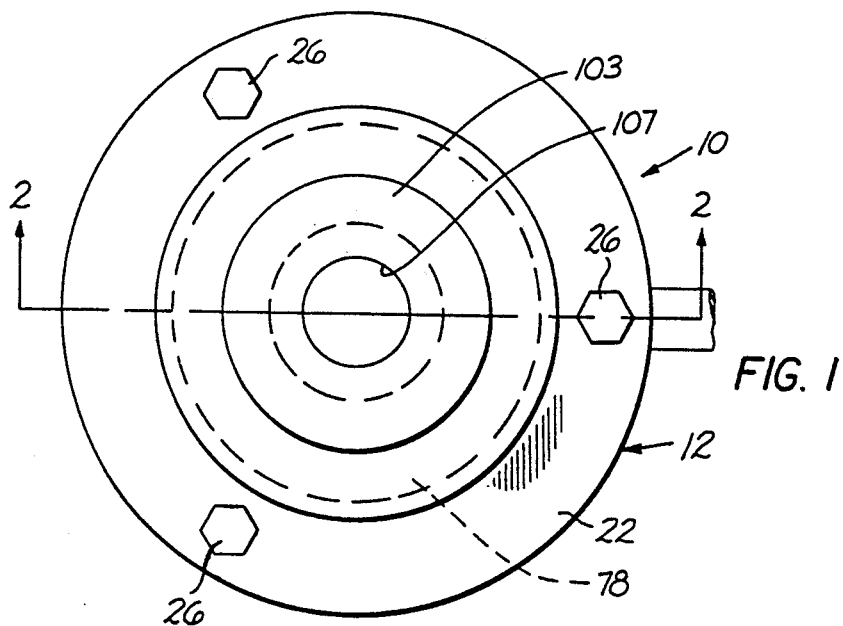
FIG. 1 is a top plan view of the change of state coupling invention with certain portions omitted for clarity.
Figure 2:
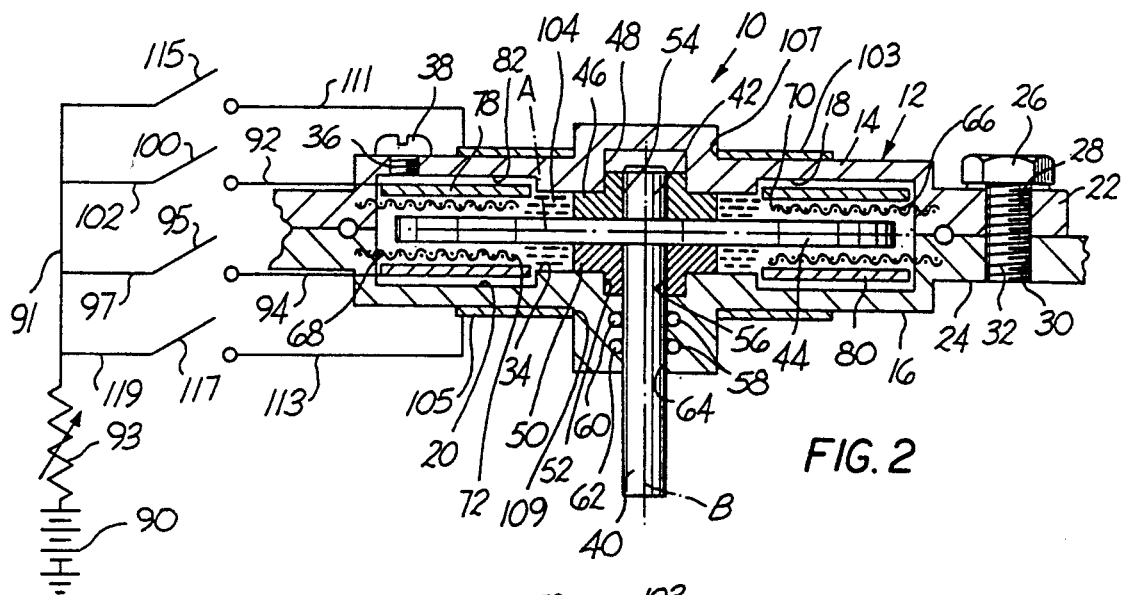
FIG. 2 is an enlarged sectional view of the change of state coupling invention taken substantially along the line 2—2 of FIG. 1 with certain portions not shown in section.
Figure 3:
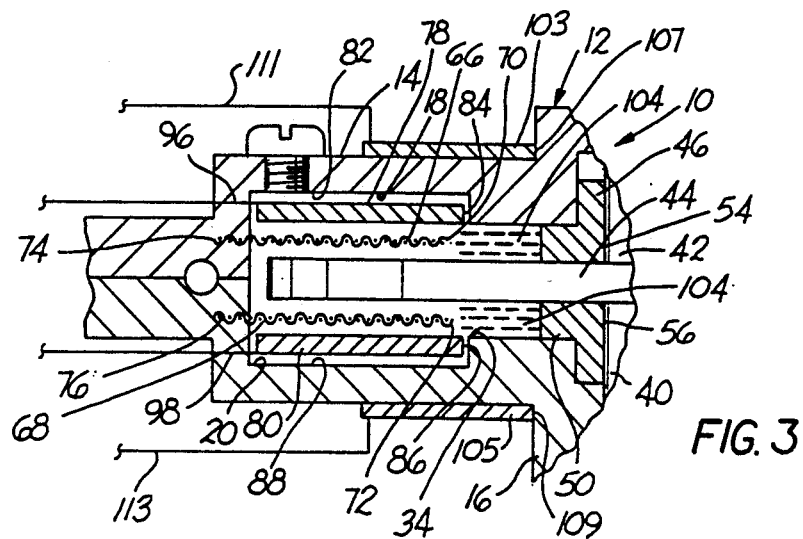
FIG. 3 is an enlarged view of a portion of the structure illustrated in FIG. 2 taken substantially within the circle 3 thereof.

Referring first to FIGS. 1, 2 and 3 the change of state coupling invention is illustrated and is designated generally by the number 10. The change of state coupling 10 comprises a hollow housing 12 that comprises an upper generally circular disk shaped housing member 14 and a lower generally circular disk shaped housing member 16. The upper housing member 14 has a generally circular cylindrical depression 18 in it and the lower housing 16 has a similar generally circular cylindrical depression 20 in it. Each housing member 14 and 16 has a respective flange portion 22 and 24 located around its outer edge and a series of bolts 26 (only one of which is shown in FIG. 2) extend through holes such as the holes 28 and 30, in the flange portions 22 and 24. The hole 30 is threaded to receive the corresponding threads 32 on the bolt 26. In this manner, through these bolts 26 the flange portions 22 and 24 are secured together to form the housing 12 with an interior cavity 34. The upper housing member 14 also has a threaded hole 36 extending through its outer wall that receives a threaded plug 38. This threaded hole serves as a filler port and a pressure relief port if it is needed.

The change of state coupling 10 also comprises an elongated cylindrical shaft 40 that has a portion 42 that is located in the cavity 34 within the housing 12. The change of state coupling 10 also comprises a substantially flat generally circular disk member 44 whose plane A is located at substantially a right angle to the long axis B of the cylindrical shaft 40. The disk member 44 is secured to the portion 42 of the shaft 40 that is located in the cavity 34 by welding or the like known in the art so that the disk member 44 rotates when the shaft 40 rotates.

The shaft portion 42 that is located in the cavity 34 is rotatably supported by an upper bushing 46 that is received in a cylindrical hole 48 in the interior of the central portion of the depression 18 in the upper housing member 14 and a lower bushing 50 that is received in a cylindrical hole 52 that is located in the central portion of the depression 20 of the interior of the lower housing member 16. The shaft portion 42 rotates in the apertures 54 and 56 in the respective upper and lower bushings 46 and 50. Two substantially identical 0-ring seals 58 fit within circular recesses 60 and 62 that are located in the circular hole 64 in the lower housing member 16.

Two disk shaped substantially flat perforated members or screen members 66 and 68 are located within the cavity 34 in the housing 14. Each of these disk shaped screen members 66 and 68 have the respective center openings 70 and 72 that permit the screen members 66 and 68 to be located around the shaft portion 42 and the associated bushings 46 and 50. The outer circumferential edge portion 74 and 76 of the respective screen members 66 and 68 are secured inside the respective depressions 18 and 20 of the respective upper and lower housing members 14 and 16 by suitable means known in the art such as by welding or being cast into place when the housing members 14 and 16 are formed.

The change of state coupling 10 also comprises two disk shaped substantially flat resistance strip heaters 78 and 80 that are located within the cavity 34 in the housing 12. The resistance heater 78 is located within a donut shaped recess 82 in the depression 18 and it has a center hole 84 to permit it to fit into this recess 82. In a similar manner, the heater 80 has a center hole 86 and it fits within a donut shaped recess 88 in the depression 20 in the lower housing member 16. The respective heaters 78 and 80 are connected to a suitable electric power source such as the battery 90 via the respective leads 92 and 94 that extend through respective holes 96 and 98 in the respective housings 14 and 16. It will be noted that the lead 92 is connected to a switch 100 that is in turn connected to a lead 102 that is connected to a lead 91 that is connected to the variable resistor 93 that is in turn connected to the battery 90. The lead 94 is connected to the switch 95 that is in turn connected to the lead 97 that is connected to the lead 91. The heaters 78 and 80 can be turned off and on through the use of the switches 100 and 95, respectively.

As indicated in FIGS. 1, 2, and 3 two optional disk shaped substantially flat resistance strip heaters 103 and 105 that are substantially similar to the strip heaters 78 and 80 are located on the exterior surfaces of the housing 12. These strip heaters 103 and 105 have respective centrally located substantially circular holes 107 and 109 and can be used with the internal strip heaters 78 and 80 or as an alternative to the internal heaters 78 and 80. The strip heaters 103 and 105 are connected to the electric power source 90 via the respective leads 111 and 113 that are in turn connected to the respective switches 115 and 117 that are in turn connected to the respective leads 91 and 119. Electric power to the heaters 103 and 105 can be turned on or off through the use of the respective switches 115 and 117. It should be noted that the power supply 90 has an adjacent variable resistor 93 so that the magnitude of the voltage supplied to the heaters 78 and 80 and/or the heaters 103 and 105 can be decreased or increased to vary the heat generated in the heaters 78, 80, 103 and 105.

As best indicated in FIG. 2, substantially the entire cavity 34 in the housing 12 is filled with a low melting point predetermined temperature change of state material 104. The particular predetermined temperature change of state material 104 is selected so that in view of its melting point the predetermined temperature change of state material 104 is solid at the temperature to which the change of state coupling 10 and in particular its housing 12 is subjected. When the predetermined temperature change of state material 104 is solid the shaft 40 and its attached disk 44 is secured to the housing 12 and hence cannot rotate with respect to the housing 12. However, when electrical power is supplied to the heaters 78 and 80 this results in the predetermined temperature change of state material 104 melting or beginning to melt which permits the disk 44 and associated shaft 40 to rotate at least to some degree with respect to the housing 112.

Figure 4:
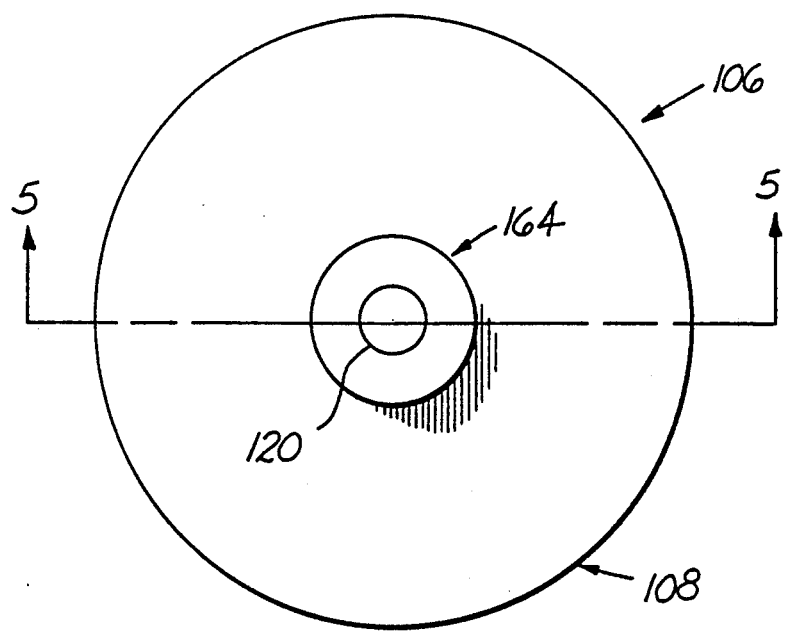
FIG. 4 is a top plan view of an additional embodiment of the change of state coupling invention with certain portions omitted for clarity.
Figure 5:
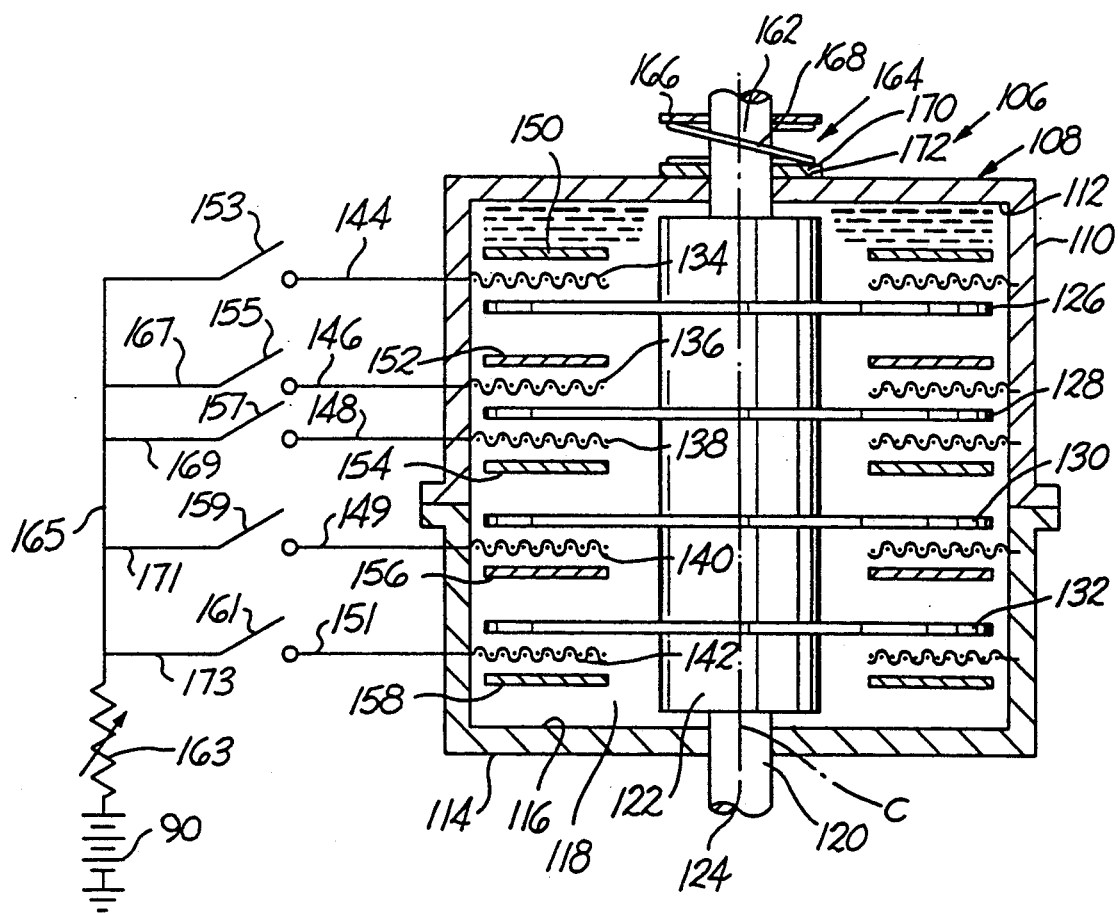
FIG. 5 is a sectional view of the additional embodiment of the change of the state coupling invention illustrated in FIG. 5 taken substantially along the line 5—5 thereof with certain portions not shown in section.

FIGS. 4 and 5 illustrate an additional embodiment of the change of state coupling that is designated generally by the member 106. The change of state coupling 106 comprises a housing 108 that is similar to the previously described housing 12 except that it is much deeper. The housing 108 has an upper housing 110 with a depression 112 and a lower housing 114 with a similar depression 116. The two depressions 112 and 116 form an internal cavity 118 in the housing 108. The upper and lower housings 110 and 114 are secured together by flanges 119 and 121 and suitable bolts (not shown) in a manner previously described with respect to the embodiment set forth in FIGS. 1, 2, and 3. The change of state coupling 106 also comprises a shaft 120 that has an enlarged portion 122 located within the cavity 118 and a lower smaller diameter portion 124 that extends outside the housing 110.

A series of disk shaped substantially flat and substantially identical member 126, 128, 130 and 132 extend outward with their planes at substantially 90 degrees with the long axis C of the shaft 120 and are secured in place by means known in the art such as by welding or the like so that they rotate with the shaft 120 as it rotates. A series of hollow donut-shaped substantially flat screen members 134, 136, 138, 140, and 142 are located adjacent the respective disk shaped members 126, 128, 130 and 132 and are secured in place by means known in the art such as by welding or the like. A series of disk shaped substantially flat substantially identical heater members 150, 152, 154, 156 and 158 are located adjacent the respective screen members 134, 136, 138, 140, and 142. These heater members 134, 136, 138, 140, and 142 are connected to respective leads 144, 146, 148, and 151 that are connected to respective switches 153, 155, 157, 159, and 161 that are connected to a variable resistor 163 via the leads 165, 167, 169, 171, and 173. The variable resistor is connected to a source of electrical power such as the previously described battery 90.

A short projecting shaft portion 162 extends outside the housing 108 and receives a clutch assembly designated generally by the number 164. The clutch assembly 164 comprises a collar 166 that is secured to the projecting portion 162 by means known in the art by welding or the like. A circular hollow center compression spring 168 is located around the shaft portion 162 between the collar 166 and a disk shaped hollow substantially flat clutch member 170 that abuts up against a clutch surface 172 that is located on the adjacent portion of the upper housing 110. The clutch assembly 164 can be used to give additional dampening to the shaft 120 in addition to that provided by the low melting point predetermined temperature change of state material 176, that is similar to the previously described predetermined temperature change of state material 104, which fills the internal cavity 118 in the housing 108. This predetermined temperature change of state material 176 normally is solid and adheres to the screen members 134, 136, 138, 140, and 142, and the disk shaped members 126, 128, 130 and 132 and hence prevent rotation of the associated shaft portion 122. However, when the heater members 150, 152, 154, 156 and 158 are energized with electrical power from the battery 90 this heats the predetermined temperature change of state material 176 to cause it to become semi-fluid which allows the shaft portion 122 to rotate within the housing 108. Continued heating results in the predetermined temperature change of state material 176 becoming fluid which allows the shaft portion 122 to rotate faster with no dampening.

The change of state coupling 10 in FIGS. 1, 2 and 3 the change of state coupling 106 in FIGS. 4 and 5 are manufactured using conventional casting and machining techniques known in the art. The hollow housings 12 and 108 are made by being cast from a suitable high strength metal, plastic or ceramic material by known techniques and the shafts and associated disk members 40, 122 and 44, 150, 152, 154, 156, and 158 are machined from a suitable grade of high strength metal, plastic or ceramic materials or the like by known techniques. The previous disk shaped screen members 66, 68, 134, 138, 140, and 142 are made by being stamped out of a suitable number mesh stainless steel screen material or the like that is known in the art using conventional stamping techniques. The other components of the change of state coupling 10 or 106 such as the bushings 46 and 50, the O-ring seals 58, the heater members 78, 80, 103, 105, 150, 152, 154,156 and 158 as well as the clutch assembly 164 are conventional in nature and are either available commercially or can be easily made by one skilled in the art through known techniques. It should be noted that certain space applications would require the absence of any induced magnetism and in this situation only non-magnetic materials should be selected.

The predetermined temperature change of state material 104 or 176 can comprise a suitable alloy selected from those that are commercially available and known as Cerro alloys that contain bismuth and are available from Cerro Metal Products of Bellefonte, Pa. or those various waxes that are machinable that are currently known in the art. The choice of the specific material will be governed by the expected temperature to which the housings 12 or 108 would be subjected during use and, of course, if a non-magnetic material 104 or 176 was desired then an appropriate wax would be selected. It should be noted that this change of state material 104 and 176 is only partially shown as a liquid in section in the respective FIGS. 2 and 5 since if all the material 104 or 176 was illustrated in liquid section it would tend to obscure the other features of the couplings 10 or 106.

The change of state coupling 10 is used in the following manner. The outer portion of the shaft 40 is connected to a suitable source of rotational power such as a motor (not shown). The housing 12 can be fixed or secured or can be permitted to rotate as part of a drive train or the like known in the art. As a consequence, the change of state coupling 10 can function as a dampener coupling, brake, clutch or the like. When the predetermined temperature change of state material 104 is solid the shaft 40 and its attached disk 44 is secured to the housing 12 and hence cannot rotate with respect to the housing 12. As previously indicated in connection with the change of state coupling 10 illustrated in FIGS. 1, 2, and 3 with no electrical power supplied to the heaters 78, 80 or 103, 105 the predetermined change of state material 104 is solid and the shaft 104 and the attached disk 44 is secured to the housing and hence can not rotate with respect to the housing 12. However, when electrical power is supplied to the heaters 78 and 80 and/or 103 and 105 by closing one or more of the switches 95, 100, 115, and 117 this results in the predetermined temperature change of state material 104 melting or beginning to melt which permits the disk 44 and associated shaft 40 to rotate at least to some degree with respect to the housing 12. The variable resistor 93 can be varied to adjust the amount of electrical power supplied to one or more of the heaters 78, 80, 103, and 105.

The change of state coupling 106 set forth in FIGS. 4 and 5 also functions in a similar manner. As previously indicated in connection with the change of state coupling 106 illustrated in FIGS. 4 and 5, with no electrical power supplied to the heater members 150, 152, 154, 156, and 158 the predetermined change of state material 176 is solid and the shaft 122 and the attached disk members 126, 128, 130, and 132 are secured to the housing 108 and hence can not rotate with respect to the housing 108. This is due to the fact that the predetermined temperature change of state material 176 adheres to the screen members 134, 136, 138, 140, 142, 144, 146 and 148 and the disk shaped members 126, 128, 130 and 132 when it is solid and hence prevents rotation of the associated shaft 122. However, when the heater members 150, 152, 154, 156 and 158 are energized with electrical power through the heater lead 144, 146, 148, 149, 151; the associated switches 153, 155, 157, 159, 161; the associated leads 165, 167, 169, 171, 173; the resistor 163 and the battery 90 this heats the predetermined temperature change of state material 176 to cause it to become semifluid which allows the shaft 122 to rotate within the housing 108. Continued heating results in the predetermined temperature change of state material 176 becoming fluid which allows the shaft 122 to rotate faster with no dampening. As previously indicated, the clutch assembly 164 can be used to give additional dampening to the shaft 120 as well as provided by the change of state material 176.

Although this invention has been described in considerable detail with reference to a certain preferred embodiments, it will be understood that variations and modifications may be made to the invention without departing from the spirit and scope of the invention as set forth in the appended claims.

What is claimed is:

1. A coupling comprising: a housing with a hollow interior; a rotary shaft having a portion thereof extending into the hollow interior of said housing; and means for controlling the rotation of said rotary shaft comprising a member connected to and projecting from the portion of said rotary shaft located within the hollow interior of said housing, at least one heater located within the hollow interior of said housing, a liquid located within the hollow interior of said housing around the member projecting from the portion of said rotary shaft located within the hollow interior of said housing and around at least a portion of said heater located within the hollow interior of said housing, said liquid having a melting point temperature such that said liquid is normally solid at the temperature to which said housing is usually exposed, and at least one perforated member connected to said housing and having a portion thereof extending into the hollow interior of said housing.

2. The coupling of claim 1 wherein said perforated member comprises a screen member.

3. The coupling of claim 2 wherein said heater is substantially flat and has a centrally located aperture through which the portion of said shaft located in said housing passes.

4. The coupling of claim 3 wherein said screen member is substantially flat and has a centrally located aperture through which the portion of said shaft located in said housing passes.

5. The coupling of claim 4 wherein said heater is located adjacent to said screen member.

6. The coupling of claim 5 further comprising a recess located in said housing and wherein said heater located within said housing is located in the recess in said housing.

7. The coupling of claim 5 further comprising at least one additional heater member located on the exterior of said housing.

8. The coupling of claim 5 comprising an additional heater located within said housing and wherein said additional heater is substantially flat and has a centrally located aperture through which the portion of said shaft located in said housing passes.

9. The coupling of claim 4 further comprising at least one additional heater located within said housing and wherein said additional heater is substantially flat and has a centrally located aperture through which the portion of said shaft located in said housing passes.

10. The coupling of claim 9 further comprising means for individually operating said heaters.

11. The coupling of claim 10 further comprising means associated with said heaters for controlling the thermal output of said heaters.

* * * * *